United States Patent [19]
Yokoi et al.

[11] Patent Number: 6,117,806
[45] Date of Patent: Sep. 12, 2000

[54] DIELECTRIC MATERIAL, A METHOD FOR PRODUCING THE SAME AND A DIELECTRIC RESONATOR DEVICE COMPRISING SAME

[75] Inventors: Hitoshi Yokoi; Akifumi Tosa; Kazushige Ohbayashi, all of Nagoya, Japan

[73] Assignee: NGK Spark Plug Co., Ltd., Nagoya, Japan

[21] Appl. No.: 08/957,627

[22] Filed: Oct. 24, 1997

[30] Foreign Application Priority Data

| Oct. 25, 1996 | [JP] | Japan | 8-301202 |
| Jul. 1, 1997 | [JP] | Japan | 9-191868 |
| Oct. 9, 1997 | [JP] | Japan | 9-293460 |

[51] Int. Cl.$^7$ ............................. C04B 35/495
[52] U.S. Cl. ............................. 501/135; 501/137
[58] Field of Search ............................. 501/135, 137, 501/138, 139

[56] References Cited

U.S. PATENT DOCUMENTS

| 4,485,180 | 11/1984 | Konoike et al. | 501/135 |
| 4,487,842 | 12/1984 | Nomura et al. | 501/135 |
| 4,585,744 | 4/1986 | Konoike et al. | 501/135 |
| 4,717,694 | 1/1988 | Tamura et al. | 501/135 |
| 4,731,207 | 3/1988 | Matsumoto et al. | 264/25 |
| 4,853,199 | 8/1989 | Inoue et al. | 501/135 |
| 4,968,649 | 11/1990 | Tsurumi et al. | 501/134 |
| 4,973,567 | 11/1990 | Matsumoto et al. | 501/135 |
| 5,039,637 | 8/1991 | Htuga et al. | 501/135 |
| 5,136,270 | 8/1992 | Hatanaka et al. | 333/219.1 |
| 5,246,898 | 9/1993 | Fujimaru et al. | 501/135 |
| 5,457,076 | 10/1995 | Katagiri et al. | 501/35 |
| 5,721,182 | 2/1998 | Reichert et al. | 501/135 |
| 5,733,831 | 3/1998 | Takada et al. | 501/135 |

FOREIGN PATENT DOCUMENTS

| 0 369 768 A2 | 5/1990 | European Pat. Off. |
| 0 399 770 A1 | 11/1990 | European Pat. Off. |
| 0 545 775 A1 | 6/1993 | European Pat. Off. |
| 0 639 541 A1 | 2/1995 | European Pat. Off. |
| 59-48484 | 11/1984 | Japan |
| 60-54899 | 12/1985 | Japan |
| 1-18523 | 4/1989 | Japan |
| 4-224161 | 8/1992 | Japan |

OTHER PUBLICATIONS

E. Kim et al., "Effect of Nickel on Microwave Dielectric Properties of Ba(Mg$_{1/3}$Ta$_{2/3}$)O$_3$", Journal of Materials Science, vol. 29, No. 3, Feb. 1994, pp. 830–834.

K. Tochi, "Improvement of Sinterability of Ba(Mg$_{1/3}$Ta$_{2/3}$)O$_3$–Powder Compacts by BaTa$_2$O$_6$ Additions", Journal of the Ceramic Society of Japan, International Edition, vol. 100, No. 12, Dec. 1992, pp. 1441–1443.

C. Lee et al., "Effect of La/K A–site Substitutions on the Ordering of Ba(Zn$_{1/3}$Ta$_{2/3}$)O$_3$", Journal of American Ceramic Society, vol. 80, No. 11, Nov. 1997, pp. 2885–2890.

Derwent Abstract of JP 05 148 005 A, Jun. 1993.

*Primary Examiner*—Karl Group
*Attorney, Agent, or Firm*—Morgan, Lewis & Bockius LLP

[57] ABSTRACT

Dielectric materials are disclosed that are based on BaO—ZnO—Ta$_2$O$_5$ represented by the formula Ba(Zn$_{1/3}$Ta$_{2/3}$)O$_3$. Ba has been partly replaced by K and either Zn or Ta has been replaced by at least one element selected from Mg, Zr, Ga, Ni, Nb, Sn. The dielectric materials have a relatively high permittivity, a small absolute value of the temperature coefficient of resonance frequency, and a high unloaded quality factor. A method for producing the dielectric materials is also disclosed which includes mixing given amounts of starting materials, such as, for example, BaCO$_3$, ZnO, Ta$_2$O$_5$, K$_2$CO$_3$, MgCO$_3$, SnO$_2$ or ZrO$_2$, compacting the mixture to produce a compact, sintering the compact in an oxidizing atmosphere such as, for example, air, at 1,400 and 1,600° C., more preferably at 1,550 to 1,600° C. for 2 hours, and then heating the sintered compact at a temperature lower than the sintering temperature by from 50 to 250° C., e.g., by 100° C., for at least 12 hours, preferably for 24 hours. A dielectric resonator comprising the dielectric material of the present invention is also disclosed.

51 Claims, 3 Drawing Sheets

DIELECTRIC MATERIAL, A METHOD FOR PRODUCING THE SAME AND A DIELECTRIC RESONATOR DEVICE COMPRISING SAME

This application claims the benefit of Japanese patent application No. Hei. 8-301202, filed Oct. 25, 1996, No. Hei. 9-293460, filed Oct. 9, 1997 and No. Hei. 9-191868, filed Jul. 1, 1997, which are hereby incorporated by reference.

BACKGROUND OF THE INVENTION

1. Field of the Invention

The present invention relates to dielectric materials of excellent quality that have a relatively high permittivity (hereinafter referred to as $\in_r$) in a high frequency region, a small absolute value of the temperature coefficient of resonance frequency (hereinafter referred to as $\tau_f$ of $f_0$), and a high unloaded quality factor (hereinafter referred to as $Q_u$). The dielectric materials of the invention can be used in applications such as multilayer circuit boards, and, in particular, high-frequency resonators and filters. This invention further relates to processes for producing the dielectric materials.

2. Discussion of the Related Art

Dielectric materials based on BaO—ZnO—$Ta_2O_5$ or BaO—MgO—$Ta_2O_5$ are frequently used in high-frequency applications. Such dielectric materials for use in high-frequency applications must satisfy the following requirements:

(i) a high $\in_r$;

(ii) a small absolute value of $\tau_f$; and (iii) a high $Q_u$ in a high-frequency region.

The dielectric materials based on BaO—ZnO—$Ta_2O_5$ or BaO—MgO—$Ta_2O_5$ are oxides represented by the empirical formula $Ba(Zn_{1/3}Ta_{2/3})O_3$ or $Ba(Mg_{1/3}Ta_{2/3})O_3$, respectively, that have a perovskite crystal structure. These oxides are generally referred to as BZT and BMT for short. Although BZT and BMT materials are excellent dielectric materials having a high $Q_u$, there is a need for a dielectric material having an even higher $Q_u$ because these dielectric materials are increasingly used in a higher-frequency region, from the microwave to the sub-millimeter wavelength region. In addition, these dielectric materials generally are produced by complex and industrially undesirable processes, which include sintering at high temperatures exceeding 1,600° C., sintering for a prolonged period, or sintering by ultrahigh-rate heating (see, for example, JP-B-6-25023, JP-A-4-224161, and JP-B-3-51242). (Here, "JP-B" and "JP-A" refer to an "examined Japanese patent publication" and an "unexamined published Japanese patent application," respectively.) Moreover, some trials of adding additives to these dielectric materials in order to improve sintering properties (see, for example, JP-B-1-18523 and JP-B-3-34164).

SUMMARY OF THE INVENTION

Accordingly, the present invention is directed to a dielectric material and method for producing the same that substantially obviates one or more of the problems due to the limitations and disadvantages of the related art.

An object of the present invention is to provide dielectric materials that have a relatively high $\in_r$, of 20 or higher, and an absolute $\tau_f$ value, as small as 10 ppm/° C. or below, and in which the product of $Q_u$ as determined by Resonant Cavity Method ($TE_{01}\delta$ mode) and $f_0$ (i.e., $Q_u \times f_0$,) is 20,000 GHz or larger, and preferably 40,000 GHz or larger. (See H. Sreemoolandhan and M. T. Sebastian, "Dielectric Ceramic Materials for Microwave Resonator Applications", *Metals Materials And Processes*, 1995, Vol.7, No.4, pp. 251–266).

Another object of the present invention is to provide methods of manufacturing the above dielectric materials.

Another object of the present invention is to provide a dielectric resonator utilizing the dielectric material of the present invention.

To achieve these and other advantages, and in accordance with the purpose of the present invention, as embodied and broadly described, in a first aspect of the present invention there is provided a dielectric material including a complex oxide having a perovskite crystal structure and having a formula $Ba(Q_\alpha Y_\beta Z_\gamma)O_\delta$, wherein O is an Oxygen, Q is a metal, Y is a metal and Z is a metal; the dielectric material also optionally including $A_p TaO_q$, wherein A is an element selected from a group consisting of K, Li and Na.

In a second aspect of the present invention, there is provided a dielectric resonator, including a dielectric resonator element including complex oxide having a perovskite crystal structure and having a formula $Ba(Q_\alpha Y_\beta Z_\gamma)O_\delta$, wherein O is an Oxygen, Q is a metal, Y is a metal and Z is a metal; the dielectric material also optionally including $A_p TaO_q$, wherein A is an element selected from a group consisting of K, Li and Na; a metal casing enclosing the dielectric resonator element; and an insulating holder member attached to the dielectric resonator with a heat-resistive adhesive layer.

In a third aspect of the present invention, there is provided a dielectric material including a complex oxide having a perovskite crystal structure, wherein metallic elements are selected from a group consisting of Ba, Zn, Ta, and K.

In a fourth aspect of the present invention, there is provided a dielectric material including a complex oxide having a perovskite crystal structure, wherein metallic elements are selected from a group consisting of Ba, Zn, Ta, and K; and wherein at least either of the Zn or the Ta are at least partly replaced by at least one element selected from the group consisting of Mg, Ca, Sr, La, B, Al, Ga, Ti, Zr, Hf, V, Nb, Si, Sn, Sb, Mn, Fe, Co, W, and Ni.

In a fifth aspect of the present invention, there is provided a dielectric material including between 80.0 and 99.9 mol % $Ba(Zn_{1/3}Ta_{2/3})O_3$ and between 0.1 and 20.0 mol % $K_p TaO_q$, wherein p is between 0.60 and 2.00.

In a sixth aspect of the present invention, there is provided a method of producing a dielectric material, wherein the dielectric material includes a complex oxide having a perovskite crystal structure, wherein metallic elements of the complex oxide are selected from a group consisting of Ba, Zn, Ta, and K as metallic elements, wherein the method includes the steps of mixing a barium compound, a zinc compound, a tantalum compound and a potassium compound to produce a mixture, wherein each of the compounds is either an oxide or a compound changing into an oxide upon heating; compacting the mixture to produce a compact; sintering the compact at a sintering temperature of between 1,300 and 1,650° C.; and heat-treating the compact at a temperature lower than the sintering temperature by from 50 to 250° C. in an oxidizing atmosphere for at least 12 hours.

In a seventh aspect of the present invention, there is provided a method of producing a dielectric material including a complex oxide having a metallic element selected from a group consisting of Ba, Zn, Ta, and K and having a perovskite crystal structure, wherein at least either of the Zn or the Ta is at least partly replaced by at least one element selected from the group consisting of Mg, Ca, Sr, La, B, Al, Ga, Ti, Zr, Hf, V, Nb, Si, Sn, Sb, Mn, Fe, Co, W, and Ni; wherein the method includes the steps of mixing a barium compound, a zinc compound, a tantalum compound, a potassium compound and a compound of the at least one element that is either an oxide or a compound changing into an oxide upon heating to create a mixture; compacting the mixture to form a compact; sintering the compact at a sintering temperature of between 1,300 and 1,650° C.; and heat-treating the compact at a temperature lower than the sintering temperature by from 50 to 250° C. in an oxidizing atmosphere for at least 12 hours.

It is to be understood that both the foregoing general description and the following detailed description are exemplary and explanatory and are intended to provide further explanation of the invention as claimed.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION OF THE PREFERRED EMBODIMENTS

Figure 1:
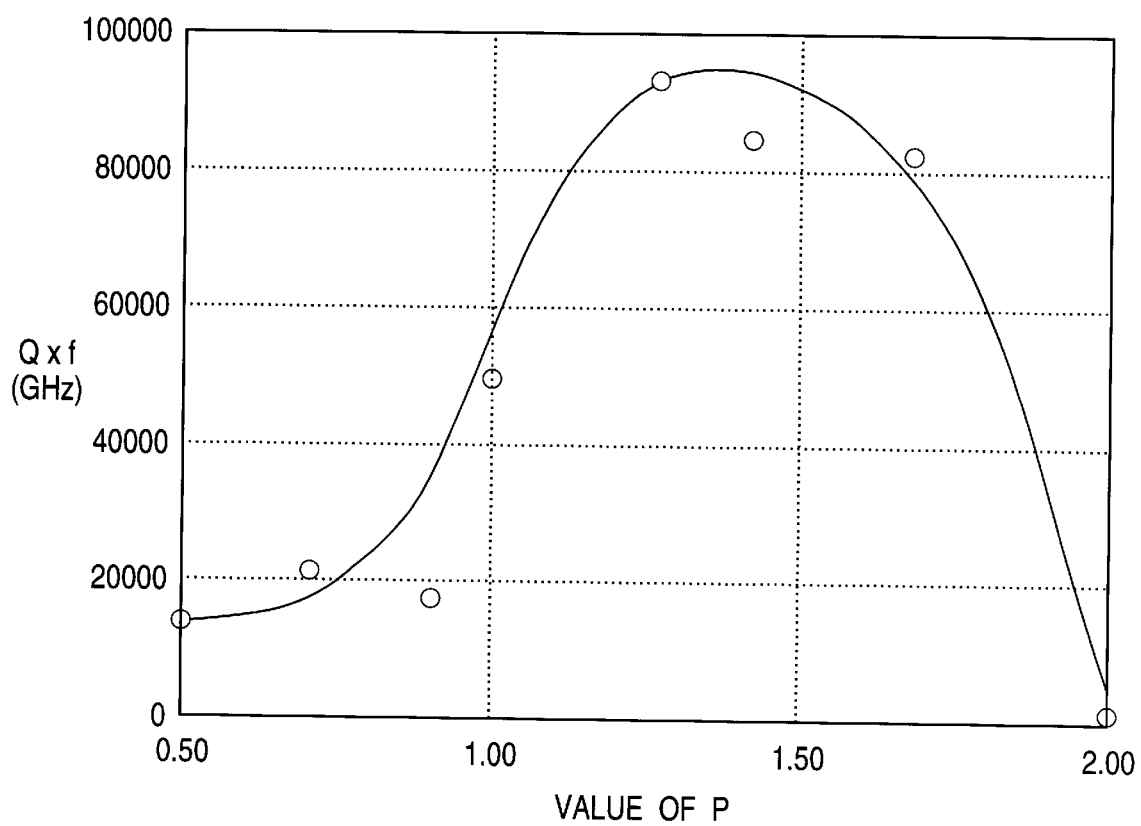
FIG. 1 illustrates the correlation between p in $K_p TaO_q$ and $Q_u \times f_0$ as determined by Resonant Cavity Method.

Reference will now be made in detail to the preferred embodiments of the present invention, examples of which are illustrated in the accompanying drawings.

In a first embodiment of the present invention, the dielectric material of the present invention includes complex oxides containing Ba, Zn, Ta, and K as metallic elements and having a perovskite crystal structure.

In a second embodiment of the present invention the dielectric material of the present invention includes complex oxides containing Ba, Zn, Ta, and K as metallic elements and having a perovskite crystal structure, wherein either Zn or Ta are partly or entirely replaced by at least one element selected from the group consisting of Mg, Ca, Sr, La, B, Al, Ga, Ti, Zr, Hf, V, Nb, Si, Sn, Sb, Mn, Fe, Co, W, and Ni.

In a third embodiment of the present invention there is provided a dielectric material including from 80.0 to 99.9 mol % $Ba(Zn_{1/3}Ta_{2/3})O_3$ and from 0.1 to 20.0 mol % $K_p TaO_q$ (wherein 0.60<p<2.00).

In a fourth embodiment of the present invention the dielectric material of the previous embodiment in which the proportion of $K_p TaO_q$ and the value of p are specified. In the dielectric materials of these two embodiments, at least either of the Zn and the Ta may have been partly or wholly replaced by at least one element selected from the group consisting of Mg, Ca, Sr, La, B, Al, Ga, Ti, Zr, Hf, V, Nb, Si, Sn, Sb, Mn, Fe, Co, W, and Ni. In this dielectric material, at least one element is preferably selected from the group consisting of Mg, Zr, Ga, Ni, Nb, and Sn.

$Ba(Zn_{1/3}Ta_{2/3})O_3$ is an oxide having a perovskite crystal structure. $K_p TaO_q$ also may be an oxide having a perovskite crystal structure. Although the Ba in the dielectric materials described above may be partly replaced by the K, the results of analysis of these dielectric materials by X-ray diffractometry revealed that they have no crystal structure other than perovskite. It is presumed that the dielectric materials of the present invention has the same perovskite crystal structure as $Ba(Zn_{1/3}Ta_{2/3})O_3$.

In a fifth embodiment of the present invention there is provided a dielectric material described above wherein the element replacing either Zn or Ta is an element preferably selected from the group consisting of Mg, Zr, Ga, Ni, Nb, and Sn. These elements are advantageous in that Zn or Ta can be easily replaced, and a material having an intact perovskite crystal structure and excellent dielectric characteristics can be easily fabricated. Note also that the elements replacing Zn or Ta are not limited to those listed above. For example, Zn or Ta may be replaced by a rare earth element, such as, for example, Y. Like the dielectric materials in which Ba has been replaced by K, such dielectric materials with Zn or Ta replaced by another element have a perovskite crystal structure and, as X-ray diffractometry results show, have no other crystal phase.

In a sixth embodiment of the present invention, the K of $K_p TaO_q$ is thought to be located in the position of the Ba of $Ba(Zn_{1/3}Ta_{2/3})O_3$, while the Ta is thought to be located in the position of the Zn or Ta of $Ba(Zn_{1/3}Ta_{2/3})O_3$. It is presumed that the dielectric material has a perovskite crystal structure consisting of $Ba(Zn_{1/3}Ta_{2/3})O_3$ containing $K_p TaO_q$ of a perovskite structure. These dielectric materials can be obtained by a process where starting materials for $Ba(Zn_{1/3}Ta_{2/3})O_3$ are mixed with each other, together with a given amount of a potassium oxide or a potassium compound that changes into an oxide upon heating (for example, carbonate and oxalate), and the mixture is compacted, sintered, and then heat-treated.

If the value of p in $K_p TaO_q$ is below 0.60, $Q_u \times f_0$ decreases considerably, sometimes to below 20,000 GHz, although $\in_r$ and $\tau_f$ are almost satisfactory. In addition, such a small value of p tends to result in increased volatilization of potassium ions during sintering, yielding a sinter having a porous surface layer, which causes a decrease in $Q_u \times f_0$. On the other hand, if p exceeds 2.00, an excess of potassium is present, and there are cases where a potassium-containing crystal phase of a structure other than perovskite generates. The presence of this phase reduces $Q_u \times f_0$. An optimum value of p varies depending on the composition, and in the case of selecting BZT as a base composition, the value of p is preferably from 1.10 to 1.90, more preferably from 1.20 to 1.80. When p is within this range, a dielectric material having exceedingly high dielectric characteristics can be obtained having $Q_u \times f_0$ of 50,000 GHZ or even 80,000 GHZ or above, and having an absolute value of $\tau_f$ of 10 ppm/° C. or even 1 ppm/° C. or smaller, depending on the composition.

In the Resonant Cavity Method, one alternative method is to place the dielectric resonator (DR) exactly at the center of a cylindrical cavity with the same aspect ratio (D/L) as that of DR material as shown in FIG. 3a of H. Sreemoolandhan and M. T. Sebastian, "Dielectric Ceramic Materials for Microwave Resonator Applications", *Metals Materials And Processes*, 1995, Vol.7, No.4, pp. 251–266. A low loss material such as quartz (single crystal) may be used to support the DR. Two coupling loops are used to couple microwave to DRs which are symmetrically mounted.

If the proportion of $K_pTaO_q$ is smaller than 0.1 mol % in the case of selecting BZT as a base composition, the dielectric material is unsatisfactory in that $Q_u \times f_0$, as determined by the Resonant Cavity Method is small, i.e. below 20,000 GHZ. In addition, sintering properties may be reduced because of the reduced amount of the potassium compound (for example, carbonate and oxalate) incorporated as a starting material. On the other hand, if the proportion of $K_pTaO_q$ exceeds 20 mol %, the value of $Q_u \times f_0$ decreases. The proportion of $K_pTaO_q$ is preferably from 0.2 to 10 mol %, and more preferably from 0.5 to 10 mol %. When the proportion of $K_pTaO_q$ is within this range, a dielectric material having excellent dielectric characteristics can be obtained, which has a high $\in_r$, an absolute $\tau_f$ value of 10 ppm/° C. or even 5 ppm/° C. or less, and a $Q_u \times f_0$ of 40,000 GHZ or larger. Furthermore, even when the proportion of $K_pTaO_q$ is as small as between approximately 2.0 and 3.0 mol %, a dielectric material having exceedingly high dielectric characteristics can be obtained as long as p is 1.20 or larger. As shown in the working examples mentioned below, it is confirmed that the dielectric materials of the present invention show excellent sintering properties and dielectric characteristics due to the addition of $K_pTaO_q$, while the optimum addition amount and p value are different slightly depending on the base composition.

In the seventh embodiment of the present invention there is provided a method of producing the dielectric material of the present invention that includes using complex oxides containing Ba, Zn, Ta, and K as metallic elements and having a perovskite crystal structure. This method includes mixing a barium compound, a zinc compound, a tantalum compound, and a potassium compound wherein each compound is either an oxide or a compound changing into an oxide upon heating (for example, carbonate); subsequently compacting the resultant mixture; sintering the compact at 1,300 to 1,650° C.;, and then heat-treating the sintered compact at a temperature lower than the sintering temperature by from 50 to 250° C. in an oxidizing atmosphere for 12 hours or longer.

In an eighth embodiment of the present invention, there is provided a method of the present invention is a process for producing a dielectric material that includes complex oxides containing Ba, Zn, Ta, and K as metallic elements and having a perovskite crystal structure in which either Zn or Ta has been partly or wholly replaced by at least one element selected from the group consisting of Mg, Ca, Sr, La, B, Al, Ga, Ti, Zr, Hf, V, Nb, Si, Sn, Sb, Mn, Fe, Co, W, and Ni. This method includes mixing a barium compound, a zinc compound, a tantalum compound, a potassium compound, and a compound of at least one element where each is either an oxide or a compound changing into an oxide upon heating (e.g., carbonate), subsequently compacting the resultant mixture, sintering the compact at 1,300 to 1,650° C., and then heat-treating the sintered compact at a temperature lower than the sintering temperature by from 50 to 250° C. in an oxidizing atmosphere for 12 hours or longer.

If the sintering is conducted at a temperature lower than 1,300° C., a sufficiently densified sinter cannot be obtained, resulting in an insufficient improvement in $Q_u$. If the sintering is conducted at a temperature exceeding 1,650° C., the volatilization of potassium ions becomes more severe, tending to result in a sinter having a porous surface layer and an insufficient improvement in $Q_u$. The sintering temperature is therefore preferably from 1,350 to 1,600° C., more preferably from 1,400 to 1,600° C.

For densification, the sintering temperature is preferably 1,500° C. or higher, more preferably 1,550° C. or higher. Although sintering temperatures less than 1,600° C. are effective in reducing the volatilization of potassium ions, temperatures lower than 1,600° C. by at least 5° C., and preferably at least 10° C., are more effective. By sintering at a temperature in the range specified above, densification proceeds sufficiently, and volatilization of potassium ions is reduced to a low level. Thus, a dielectric material having excellent performance can be obtained. Although the period of sintering is not particularly limited, it is preferably between 1 and 4 hours, more preferably about 2 hours. The atmosphere for the sintering may be an oxidizing atmosphere, for example, air, or a reducing atmosphere containing hydrogen.

If the heat treatment is conducted at a relatively high temperature that is lower than the sintering temperature by less than 50° C., coarse grains are likely to generate because of enhanced grain growth, and an inhomogeneous material is likely to result. If the heat treatment is conducted at a relatively low temperature (lower than the sintering temperature by more than 250° C.), the dielectric material does not acquire a long-period superlattice crystal structure, resulting in an insufficient improvement in $Q_u$. The temperature for the heat treatment is preferably 70 to 200° C. lower than the sintering temperature, but more preferably 70 to 150° C. lower and further preferably still by from 80 to 150° C. lower. By conducting the heat treatment at a temperature lower than the sintering temperature by, for example, about 100° C., a dielectric material having a superlattice structure can be easily obtained.

The heat treatment is conducted in an oxidizing atmosphere. For example, air can be used as an atmosphere. Use of air as the atmosphere for the heat treatment is preferred because it requires neither a special procedure nor any special equipment. However, an oxidizing atmosphere in which the partial pressure of oxygen is higher than that in the air is preferred from the standpoint of dielectric properties, because use of this atmosphere yields a dielectric material with a better $Q_u$. If the heat treatment is conducted for a period less than 12 hours, it is impossible to convert a large proportion of the crystal structure into a superlattice structure, resulting in an insufficient improvement in $Q_u$. In order to have sufficient conversion into a superlattice structure, the period of the heat treatment is preferably 15 hours or longer, more preferably 18 hours or longer. A heat treatment period of 24 hours is sufficient. Although an even longer period, such as, for example, 48 hours may be used, such long-term heat treatment is only minimally effective from the standpoint of performance improvement.

The reasons why the replacement of Ba by K in complex oxides having perovskite crystal structure represented by a BZT dielectric material results in an improvement in the $Q_u$ of the material are not yet clear. One possible explanation is that the BZT dielectric material, having a perovskite crystal structure, forms a solid solution with $K_pTaO_q$ which also has a perovskite crystal structure, whereby the BZT dielectric material acquires a longer-period superlattice crystal structure and hence a high $Q_u$. Another possible explanation is that where $K_pTaO_q$ having an irregular composition exists in the crystal structure, holes also are regularly located to form a superlattice structure, and the holes facilitate the movement of ions and atoms during sintering, accelerating densification. Due to this densification-accelerating effect, densification can be easily accomplished in producing BZT materials which have until now been produced through long-term sintering, or sintering by ultrahigh-rate heating, from substances having poor suitability for sintering.

Figure 4:
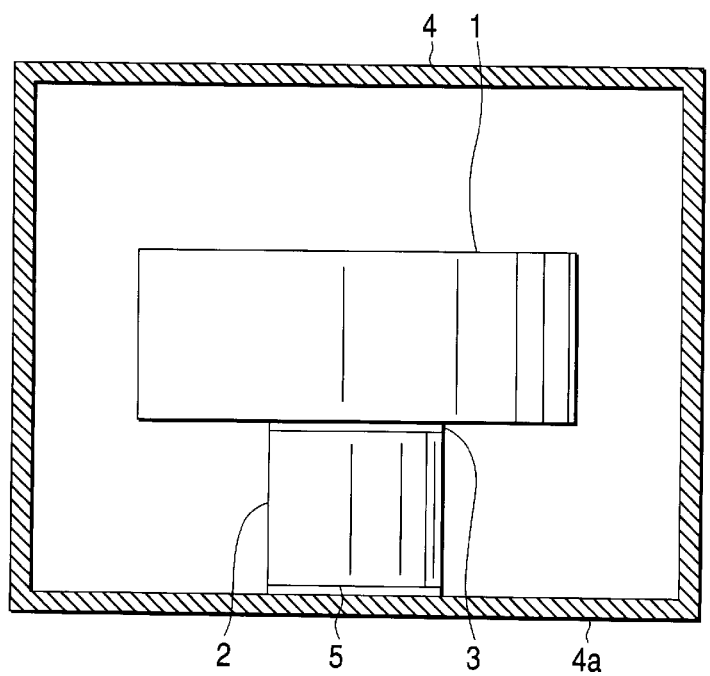
FIG. 4 illustrates a dielectric resonator utilizing the dielectric material of the present invention.

In the ninth embodiment of the present invention, there is provided a dielectric resonator as shown in FIG. 4 including the dielectric material of the present invention. The resonator body 1 of a circular or rectangular shape in cross section is bonded to one end of holding member 2 by means of, for example, an epoxy resin type adhesive. The intergrated resonator body 1 and holding member 2 are contained in the inside of metal cantainer 4 of a cylindrical shape the both end surface of which are sealed up. One end of the holding member 2 is fixed and bonded to the center of the bottom surface 4a of the metal container 4 by means of PTTF.

The present invention will be further explained by reference to Experimental Examples, although the invention should not be construed as being limited thereto.

EXPERIMENTAL EXAMPLES 1 TO 48

(1) Production of Dielectric Materials

Commercial $BaCO_3$, ZnO (or any of the other oxides discussed below), $Ta_2O_5$, and $K_2CO_3$ powders were mixed in various proportions, creating the compositions shown in Tables 1, 2, 3 and 4 under Experimental Examples 1 to 48. Each resultant composition was placed in a ball mill, and ethanol was then added thereto to conduct wet milling. In Tables 1 to 4, the proportions of all the ingredients are given in terms of oxide amounts. In place of ZnO and $Ta_2O_5$, (1) MgO was incorporated in Experimental Examples 13, 27 and 36–39; (2) $ZrO_2$ was incorporated in Experimental Examples 14, 32 and 33 in addition to ZnO; (3) $SnO_2$ was incorporated in Experimental Example 15; (4) NiO was incorporated in Experimental Examples 28 and 29, (5) $Ga_2O_3$ was incorporated in Experimental Examples 30 and 31; (6) $Nb_2O_5$ was incorporated in Experimental Examples 34 and 35; and (7) MgO and $SnO_2$ were incorporated in Experimental Examples 40–48. In Experimental Examples 11 and 12, $Na_2CO_3$ and $Li_2CO_3$, respectively, were used in place of $K_2CO_3$.

The slurries obtained by wet milling were dried and then calcined at 1,100° C. for 2 hours. A wax binder, a mixing/dispersing agent including a polycarboxylic acid and an amine, and ethanol were added to each resultant calcined powder. The mixtures were pulverized and homogenized with a ball mill. Subsequently, the slurries obtained were dried, granulated, and then compacted at a pressure of 1 GPa into a cylindrical form having a diameter of 23 mm and a thickness of 12 mm. The cylindrical compacts were subjected to cold isostatic pressing (CIP) at a pressure of 15 GPa, and then sintered for 2 hours in an air atmosphere at 1,600° C. in Experimental Examples 24 and 27 to 48, at 1,650° C. in Experimental Example 25, at 1,700° C. in Experimental Example 26, and at 1,550° C. in other Experimental Examples. Subsequently, the temperatures of the sintered compacts were lowered to 1,450° C., at which the sintered compacts were heat-treated for 24 hours.

(2) Evaluation of Dielectric Characteristics

The dielectric materials thus obtained were subjected to surface grinding or mirror polishing with a resin-bonded grindstone having a grain size of 200. The ground dielectric materials were examined for $\in_r$, $Q_u$, and $\tau_f$ by the Hakki and Coleman method (See Denesh C. Dube, Rudolf Zurmuhien, Andrew Bell and Nava Setter, "Dielectric Measurements on High-Q Ceramics in the Microwave Region" *J.Am.Ceram.Soc.*, 80[5] 1095–1100) ($TE_{011}$ mode) or Resonant Cavity Method ($TE_{01}\delta$ mode) at a frequency of 3 to 6 GHZ (temperature range: 25–80° C.). The results obtained are shown in Tables 5, 6, 7 and 8. In these Tables, the results concerning dielectric loss properties are given in terms of $Q_u \times f_0$. Since $f_0$ varies slightly with the measurement for determining $Q_u$, the product of $Q_u$ and $f_0$ is used for a more precise expression of dielectric loss. In Tables 1 to 8, the "A" in $A_pTaO_q$ represents an alkali metal, i.e. K, Na, or Li. In Tables 5, 6, 7 and 8, grinding refers to surface grinding and polishing refers to mirror polishing.

In the Hakki and Coleman method, the dielectric specimen is short-circuited (touched) by two conducting plates on both sides. Two small antennas are positioned in the vicinity of the specimen to couple power in and out of the resonator.

The results are given in Tables 5 to 8. The dielectric material obtained in Experimental Example 2, where the proportion of $K_pTaO_q$ was as small as 0.25 mol % (although p was 1.00), had an exceedingly small absolute value of $\tau_f$ and a somewhat small $Q_u \times f_0$ value of about 30,000 GHZ. However, this dielectric material is a great improvement in both $Q_u \times f_0$ and $\tau_f$ as compared to the potassium-free dielectric material obtained in Experimental Example 1. The dielectric materials obtained in Experimental Examples 3, 4, 8 to 10, 13 to 16, 21 to 35, 37–39 and 41–48, where p was between 1.00 and 1.70 and the proportion of $K_pTaO_q$ was 0.5 mol % or larger, had excellent dielectric characteristics with a $Q_u \times f_0$ of from 37,700 to 143,700 GHZ, except for the dielectric material obtained in Experimental Example 26 through sintering at 1,700° C. In particular, in case of selecting BZT as a base composition, the dielectric materials obtained in Experimental Examples 9, 10, 14–16, 24–26 and 28–35, where p was between 1.25 to 1.70, had even higher dielectric characteristics, with a $Q_u \times f_0$ ranging from 71,100 to 112,600 GHZ.

On the other hand, the dielectric materials obtained in Experimental Examples 1, 36 and 40, which contained no potassium, had considerably worse dielectric characteristics, with an exceedingly small $Q_u \times f_0$ value, compared to the system having the same base material and containing potassium. That is, as is clear from the composition between Experimental Examples 1 and 24, Experimental Examples 36 and 27, and Experimental Examples 40 and 47, the values of $Q_u \times f_0$ in the system where potassium was added were improved regardless of the base composition, while the optimum addition amount and p value were slightly different depending on the base composition. The dielectric material obtained in Experimental Example 5, where p was 0.50, had insufficient performance with a value of $Q_u \times f_0$ in the $TE_{01}\delta$ mode (note that hereinafter all values of $Q_u \times f_0$ were determined in the $TE_{01}\delta$ mode) of 14,300 GHZ, although the absolute values of $\tau_f$ were small. The dielectric material obtained in Experimental Example 17, where p was 2.00, had an exceedingly small $Q_u \times f_0$ value of less than 5,000 GHZ and a relatively low $\in_r$, although the absolute value of $\tau_f$ was very small. The dielectric material obtained in Experimental Example 18, where p was 3.00, could not be tested for dielectric characteristics because its resonance was weak. The dielectric materials obtained in Experimental Examples 19 and 20, where p was 4.00 to 5.00, respectively, developed cracks during sintering and hence had no measured characteristics.

The dielectric characteristics of the dielectric materials obtained in Experimental Examples 9 and 24 to 26, which had been obtained from the same composition through sintering at different temperatures, were as follows. The dielectric material of Experimental Example 24, which had been obtained through sintering at 1,600° C., had the largest value of $Q_u \times f_0$, which was higher than 100,000 GHZ. The dielectric material of Experimental Example 9, which had been obtained through sintering at 1,550° C., also had a high $Q_u \times f_0$ that exceeded 90,000 GHZ. On the other hand, the dielectric material of Experimental Example 26, which had been obtained through sintering at a relatively high temperature of 1,700° C., had a drawback in that the sinter had suffered surface melting. Furthermore, the dielectric material of Experimental Example 25, which had been obtained through sintering at 1,650° C., had a drawback in that the surface of the sinter had developed minute cracks probably due to the volatilization of potassium, although the dielectric material had a high $Q_u \times f_0$. These results indicate that the preferred range of the sintering temperature is from 1,550 to 1,600° C.

The results given in Tables 5 to 8 further show that by replacing Zn or Ta either in part or entirely with any of the other elements specified above, $\tau_f$ can be regulated to a desired value to some degree while still maintaining a high $Q_u \times f_0$, as in the dielectric materials obtained in Experimental Examples 14, 28 to 35 and 41–45. Specifically, by replacing part of Zn and Ta by Zr (Experimental Examples 14, 32, and 33) or replacing part of Ta by Nb (Experimental Examples 34 and 35), $\tau_f$ can be shifted to the positive side by values corresponding to the replacement amounts. By replacing part of Zn by Ni (Experimental Examples 28 and 29) or replacing part of Zn and Ta with Ga (Experimental Examples 30 and 31), $\tau_f$ can be shifted to the negative side by values corresponding to the replacement amounts. Further, $\tau_f$ can be controlled by adjusting the ratio Mg, Sn and Ta as in Experimental Examples 27 and 41–45.

It is also possible to regulate $\in_r$ to a desired value to some degree while maintaining a high $Q_u \times f_0$ by replacing either Zn or Ta entirely with any of the other elements enumerated above, as in the dielectric materials obtained in Experimental Examples 13, 27, 37–39 and 41–48. Specifically, the results for Experimental Examples 13, 27 and 37–39 show that $\in_r$ can be shifted by entirely replacing Zn with Mg. By replacing entire of Zn and part of Ta by Mg and Sn (Experimental Examples 41–48), $\in_r$ can be shifted. In the present invention, part of Zn and Ta may be replaced by an element having a different valence, for example, Zr or Ga. With this replacement, a dielectric material having excellent performance can also be obtained.

The dielectric materials obtained in Experimental Examples 11 and 12 had an exceedingly low $Q_u \times f_0$. In these experiments another alkali metal, i.e., Na or Li, was used in place of K as the element replacing Ba. Each of these dielectric materials had a p of 1.44 and the proportion of $A_p TaO_q$ was 2.50 mol %, which was in the preferred range. Thus, only K produces the desired effect, and using Na or Li, which are also alkali metals, produces no effect. With respect to the influence of surface finishing, such as surface grinding or mirror polishing, the test pieces which had undergone mirror polishing seemed to have slightly larger values of $Q_u \times f_0$, with some exceptions.

(3) Correlation between p and $Q_u \times f_0$ or $\tau_f$

Figure 2:
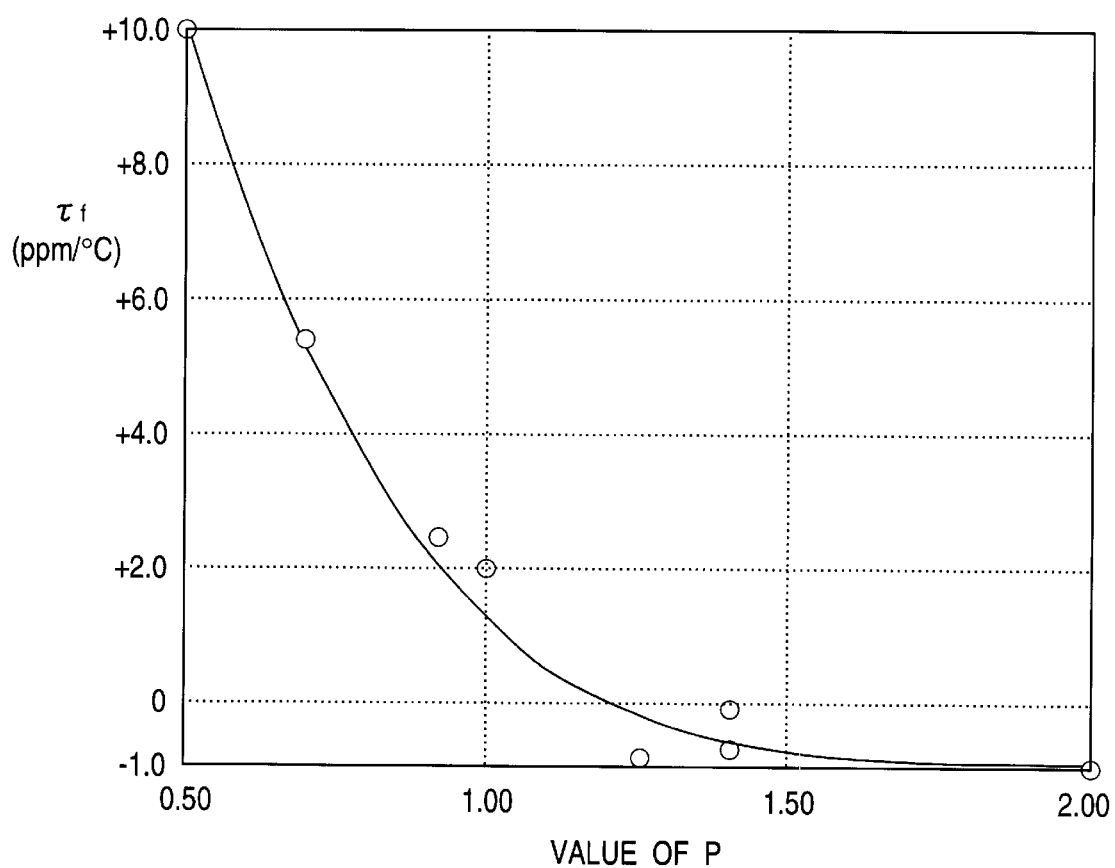
FIG. 2 illustrates the correlation between p in $K_p TaO_q$ and $\tau_f$.

FIG. 1 shows the correlation between p and $Q_u \times f_0$ in the dielectric materials shown in Tables 5 and 6, where the base composition was $Ba(Zn_{1/3}Ta_{2/3})O_3$, p was in the range of between 0.50 and 2.00, and the proportion of $K_p TaO_q$ was 2.50. These represent the dielectric materials obtained in Experimental Examples 5 to 10, 16, and 17. The correlation between p and $\tau_f$ in these dielectric materials is shown in FIG. 2. As shown in FIG. 1, $Q_u \times f_0$ reached a maximum when p was around 1.20 to 1.40, and $Q_u \times f_0$ decreased abruptly as p decreased to below 1.00 or increased beyond 1.70. As shown in FIG. 2, when p was in the range of between 1.20 and 1.70, $\tau_f$ was very satisfactory, with its absolute value below 1.0. Although the absolute value of $\tau_f$ increased with reducing p, it was still a very small value even when p was 2.00. As in Experimental Examples 13, 27, 37 and 38, in the case when $K_p TaO_q$ was added to the base material other than BZT, $Q_u \times f_0$ varied depending on the value of p and had a maximum value when p was from 1 to 2, while the optimum value of p is different from that of BZT base material.

Figure 3:
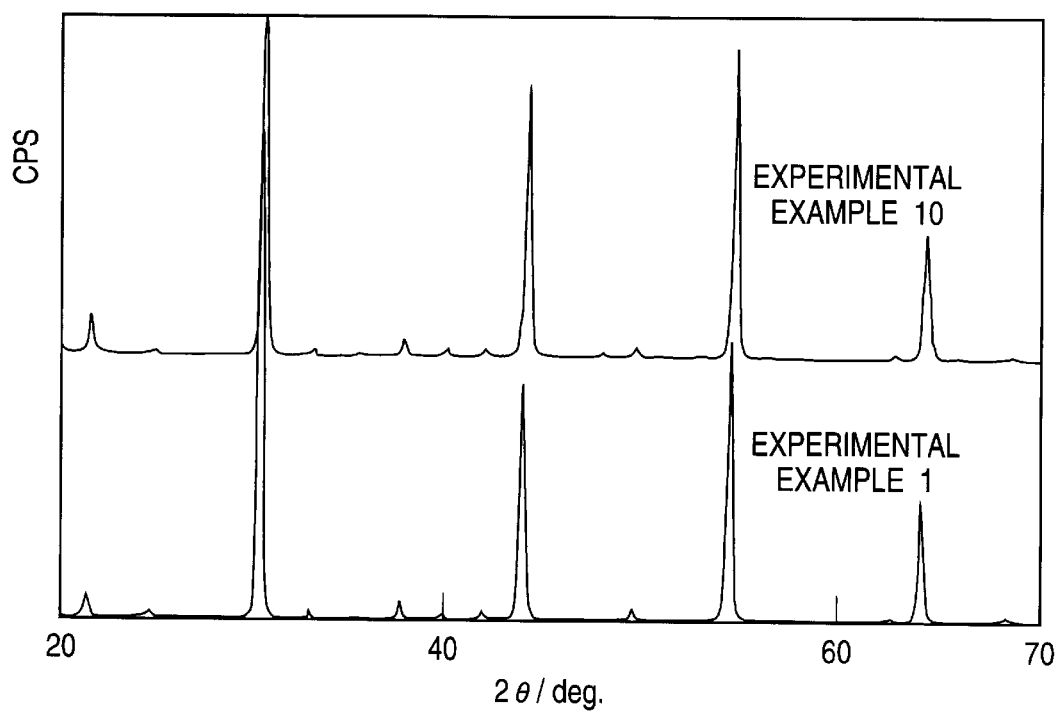
FIG. 3 is a chart illustrating a comparison in X-ray diffraction patterns between dielectric material obtained in Experimental Example 1 and a dielectric material obtained in Experimental Example 10.

(4) Comparison in X-ray Diffraction Pattern between a Dielectric Material Containing K in place of Ba and a Dielectric Material not Containing K FIG. 3 shows a comparison in X-ray diffraction patterns between the dielectric material obtained in Experimental Example 1, which did not contain K, and the dielectric material obtained in Experimental Example 10, where p was 1.44 and the proportion of $K_p TaO_q$ was 2.50 mol %. FIG. 3 shows that no crystal phase other than perovskite was formed even in the dielectric material of Experimental Example 10, where Ba had been partly replaced by K, although the peaks in the diffraction pattern shifted slightly due to the formation of a solid solution containing $K_p TaO_q$.

(5) Measurement of Density and Degree of Shrinkage

The dielectric materials obtained by the method described above were examined for density and the degree of shrinkage by the following methods.

(i) Density: Archimedes' method (ii) Degree of shrinkage: {[(outer diameter of compact before CIP)−(outer diameter of sinter)]/(outer diameter of compact before CIP)}×100 (%)

The results obtained are given in Tables 9, 10 and 11 and show the following. The dielectric materials did not greatly differ in density, except for the dielectric material obtained in Experimental Example 18, which could not be tested for dielectric characteristics because of its weak resonance and the dielectric material obtained in Experimental Example 40 where potassium was not added. With respect to the degree of shrinkage, the potassium-free dielectric material obtained in Experimental Example 1 had a rather small value. This is because the BZT material was difficult to sinter. The material also was difficult to sufficiently densify by an ordinary sintering technique without using a sintering aid. The dielectric material obtained in Experimental Example 13, 27 and 36–48, where Zn had been replaced by Mg, had a high degree of shrinkage because the MgO used as a starting material was a fine and bulky powder. The dielectric materials obtained in the Experimental Examples other than Experimental Examples 1, 13, 27 and 36–48 did not greatly differ in their degree of shrinkage. In these dielectric materials, the degree of shrinkage seemed to have no correlation with $Q_u \times f_0$.

In the dielectric materials obtained in Experimental Examples 9 and 24 to 26 from the same composition through sintering at different temperatures, higher sintering temperatures resulted in lower densities. This is because as the sintering temperature increases, potassium becomes more volatile and, as a result, a porous layer is likely to form on the periphery of the sinter. The decrease in density with increasing sintering temperature may also be attributable to the inhibition of densification due to the growth of crystal grains. These measurement results also support the preferred sintering temperature range of between 1,550 and 1,600° C., similar to using method (2) above.

(6) Analysis for Potassium Content

The dielectric materials obtained in Experimental Examples 8 and 23 were analyzed for elemental composition by ICP spectrometry. The results obtained are shown in Table 12, where each theoretical value is the same as the proportion of the ingredient actually mixed. Each number given in parentheses under "K" represents the proportion of volatilized potassium.

From the results given in Table 12, including the measured values of potassium content, and from the results of measurement of dielectric characteristics, it is presumed that in a compact containing potassium in an amount (p>1.00) larger than the stoichiometric amount, the excess potassium volatilizes in the sintering step to almost stoichiometrically yield $KTaO_3$ (p=1.00), and the dielectric material thus obtained has an especially high $Q_u \times f_0$.

(7) An Example of Dielectric Resonator Prepared by Using Dielectric Material of the Invention FIG. 4 illustrates an example of a dielectric resonator providing resonator body 1 comprising the dielectric material of the present invention. The resonator body 1 is bonded to one end of holding member 2 by means of, for example, an epoxy resin type adhesive. The intergrated resonator body 1 and holding member 2 are contained in the inside of metal cantainer 4 of a cylindrical shape the both end surface of which are sealed up. One end of the holding member 2 is fixed and bonded to the center of the bottom surface 4a of the metal container 4 by means of PTTF.

As demonstrated above, the dielectric materials of present invention have a specific crystal structure, a relatively high $\in_r$, a small absolute value of $\tau_f$, and a large value of $Q_u \times f_0$. The processes for production of these dielectric material is easy and uses no unusual complex or industrially disadvantageous sintering techniques, such as long-term sintering or sintering by ultrahigh-rate heating.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

TABLE 1

| Experimental | Base Composition (wt %) | | | | | | $A_pTaO_q$ Ingredient (wt %) | | | |
| --- | --- | --- | --- | --- | --- | --- | --- | --- | --- | --- |
| Example | BaO* | ZnO | MgO | $ZrO_2$ | $SnO_2$ | $Ta_2O_5$ | $K_2O$* | $Na_2O$* | $Li_2O$* | $Ta_2O_5$ |
| 1 | 46.78 | 8.28 | — | — | — | 44.94 | — | — | — | — |
| 2 | 46.68 | 8.26 | — | — | — | 44.85 | 0.04 | — | — | 0.17 |
| 3 | 46.59 | 8.24 | — | — | — | 44.76 | 0.07 | — | — | 0.34 |
| 4 | 46.21 | 8.17 | — | — | — | 44.39 | 0.22 | — | — | 1.01 |
| 5 | 45.90 | 8.12 | — | — | — | 44.10 | 0.18 | — | — | 1.70 |
| 6 | 45.87 | 8.12 | — | — | — | 44.07 | 0.25 | — | — | 1.69 |
| 7 | 45.85 | 8.11 | — | — | — | 44.04 | 0.31 | — | — | 1.69 |
| 8 | 45.82 | 8.11 | — | — | — | 44.02 | 0.36 | — | — | 1.69 |
| 9 | 45.78 | 8.10 | — | — | — | 43.98 | 0.45 | — | — | 1.69 |
| 10 | 45.75 | 8.09 | — | — | — | 43.95 | 0.52 | — | — | 1.69 |
| 11 | 45.83 | 8.12 | — | — | — | 44.02 | — | 0.34 | — | 1.69 |
| 12 | 45.91 | 8.12 | — | — | — | 44.11 | — | — | 0.17 | 1.69 |

*Carbonic acid salt was used as starting material.

TABLE 2

| Experimental | Base Composition (wt %) | | | | | | $A_pTaO_q$ Ingredient (wt %) | | | |
| --- | --- | --- | --- | --- | --- | --- | --- | --- | --- | --- |
| Example | BaO* | ZnO | MgO | $ZrO_2$ | $SnO_2$ | $Ta_2O_5$ | $K_2O$* | $Na_2O$* | $Li_2O$* | $Ta_2O_5$ |
| 13 | 47.70 | — | 4.18 | — | — | 45.82 | 0.54 | — | — | 1.76 |
| 14 | 46.11 | 7.59 | — | 2.22 | — | 41.86 | 0.52 | — | — | 1.70 |
| 15 | 45.98 | 7.32 | — | — | 4.07 | 40.41 | 0.52 | — | — | 1.70 |
| 16 | 45.70 | 8.09 | — | — | — | 43.91 | 0.61 | — | — | 1.69 |
| 17 | 45.66 | 8.08 | — | — | — | 43.86 | 0.72 | — | — | 1.68 |
| 18 | 45.49 | 8.05 | — | — | — | 43.70 | 1.08 | — | — | 1.68 |
| 19 | 45.33 | 8.02 | — | — | — | 43.55 | 1.43 | — | — | 1.67 |
| 20 | 45.17 | 7.99 | — | — | — | 43.39 | 1.78 | — | — | 1.67 |
| 21 | 44.85 | 7.93 | — | — | — | 43.09 | 0.73 | — | — | 3.40 |
| 22 | 43.87 | 7.76 | — | — | — | 42.15 | 1.09 | — | — | 5.13 |
| 23 | 42.88 | 7.59 | — | — | — | 41.20 | 1.46 | — | — | 6.87 |

*Carbonic acid salt was used as starting material.

TABLE 3

| Experimental | Base Composition (wt %) | | | | | | | | | $A_pTaO_q$ Ingredient (wt %) | | | |
| --- | --- | --- | --- | --- | --- | --- | --- | --- | --- | --- | --- | --- | --- |
| Example | BaO* | ZnO | MgO | NiO | $Ga_2O_3$ | $ZrO_2$ | $SnO_2$ | $Nb_2O_5$ | $Ta_2O_5$ | $K_2O$* | $Na_2O$* | $Li_2O$* | $Ta_2O_5$ |
| 24 | 45.78 | 8.10 | — | — | — | — | — | — | 43.98 | 0.45 | — | — | 1.69 |
| 25 | 45.78 | 8.10 | — | — | — | — | — | — | 43.98 | 0.45 | — | — | 1.69 |

TABLE 3-continued

| Experimental Example | Base Composition (wt %) | | | | | | | | | $A_pTaO_q$ Ingredient (wt %) | | | |
|---|---|---|---|---|---|---|---|---|---|---|---|---|---|
| | BaO* | ZnO | MgO | NiO | $Ga_2O_3$ | $ZrO_2$ | $SnO_2$ | $Nb_2O_5$ | $Ta_2O_5$ | $K_2O$* | $Na_2O$* | $Li_2O$* | $Ta_2O_5$ |
| 26 | 45.78 | 8.10 | — | — | — | — | — | — | 43.98 | 0.45 | — | — | 1.69 |
| 27 | 47.74 | — | 0.47 | — | — | — | — | — | 45.86 | 0.47 | — | — | 1.76 |
| 28 | 45.74 | 7.28 | — | 0.67 | — | — | — | — | 44.17 | 0.45 | — | — | 1.69 |
| 29 | 45.79 | 6.08 | — | 1.78 | — | — | — | — | 44.21 | 0.45 | — | — | 1.69 |
| 30 | 45.88 | 8.04 | — | — | 0.28 | — | — | — | 43.65 | 0.45 | — | — | 1.70 |
| 31 | 46.06 | 7.82 | — | — | 0.84 | — | — | — | 43.13 | 0.45 | — | — | 1.70 |
| 32 | 45.99 | 8.05 | — | — | — | 0.74 | — | — | 43.07 | 0.45 | — | — | 1.70 |
| 33 | 46.15 | 7.59 | — | — | — | 2.22 | — | — | 41.89 | 0.45 | — | — | 1.70 |
| 34 | 46.56 | 8.16 | — | — | — | — | — | 2.83 | 40.27 | 0.46 | — | — | 1.72 |
| 35 | 47.86 | 8.36 | — | — | — | — | — | 7.05 | 34.49 | 0.47 | — | — | 1.77 |

*Carbonic acid salt was used as starting material.

TABLE 4

| Experimental Example | Base Composition (wt %) | | | | | | $A_pTaO_q$ Ingredient (wt %) | | | |
|---|---|---|---|---|---|---|---|---|---|---|
| | BaO* | ZnO | MgO | $ZrO_2$ | $SnO_2$ | $Ta_2O_5$ | $K_2O$* | $Na_2O$* | $Li_2O$* | $Ta_2O_5$ |
| 36 | 48.82 | — | 4.28 | — | — | 46.90 | — | — | — | — |
| 37 | 47.77 | — | 4.18 | — | — | 45.90 | 0.38 | — | — | 1.77 |
| 38 | 46.72 | — | 4.09 | — | — | 44.89 | 0.76 | — | — | 3.54 |
| 39 | 46.63 | — | 4.09 | — | — | 44.80 | 0.94 | — | — | 3.54 |
| 40 | 49.06 | — | 3.65 | — | 7.23 | 40.06 | — | — | — | — |
| 41 | 47.84 | — | 3.98 | — | 2.35 | 43.65 | 0.46 | — | — | 1.72 |
| 42 | 47.91 | — | 3.78 | — | 4.70 | 41.42 | 0.46 | — | — | 1.73 |
| 43 | 47.98 | — | 3.57 | — | 7.08 | 39.18 | 0.46 | — | — | 1.73 |
| 44 | 48.06 | — | 3.37 | — | 9.45 | 36.93 | 0.46 | — | — | 1.73 |
| 45 | 48.13 | — | 3.16 | — | 11.84 | 34.68 | 0.46 | — | — | 1.73 |
| 46 | 48.62 | — | 3.62 | — | 7.17 | 39.70 | 0.19 | — | — | 0.70 |
| 47 | 46.95 | — | 3.50 | — | 6.93 | 38.34 | 0.90 | — | — | 3.38 |
| 48 | 44.63 | — | 3.32 | — | 6.58 | 36.43 | 1.90 | — | — | 7.14 |

*Carbonic acid salt was used as starting material.

TABLE 5

| Experimental Example | Base Composition | $A_pTaO_q$ Ingredient | | Dielectric Properties | | | | | |
|---|---|---|---|---|---|---|---|---|---|
| | | Value of p | A | Proportion (mol %) | $\epsilon_r$ | Qxf (GHz) 01δ/grinding | Qxf (GHz) 01δ/polishing | Qxf (GHz) 011/grinding | Qxf (GHz) 011/polishing | $\tau_f$ (ppm/° C.) |
| 1 | $Ba(Zn_{1/3}Ta_{2/3})O_3$ | — | — | 0.00 | 26.9 | 1500 | 13 | 1500 | — | 36.4 |
| 2 | $Ba(Zn_{1/3}Ta_{2/3})O_3$ | 1.00 | K | 0.25 | 28.8 | 29700 | — | 20500 | — | -0.6 |
| 3 | $Ba(Zn_{1/3}Ta_{2/3})O_3$ | 1.00 | K | 0.50 | 28.8 | 42300 | — | 25300 | — | 1.5 |
| 4 | $Ba(Zn_{1/3}Ta_{2/3})O_3$ | 1.00 | K | 1.50 | 28.6 | 48600 | 50100 | 24300 | 24400 | 2.3 |
| 5 | $Ba(Zn_{1/3}Ta_{2/3})O_3$ | 0.50 | K | 2.50 | 29.8 | 14300 | — | 14300 | — | 10.0 |
| 6 | $Ba(Zn_{1/3}Ta_{2/3})O_3$ | 0.70 | K | 2.50 | 29.5 | 20200 | 24100 | 20100 | 19700 | 5.5 |
| 7 | $Ba(Zn_{1/3}Ta_{2/3})O_3$ | 0.85 | K | 2.50 | 29.5 | 18100 | — | 18800 | — | 2.4 |
| 8 | $Ba(Zn_{1/3}Ta_{2/3})O_3$ | 1.00 | K | 2.50 | 29.5 | 48900 | 53300 | 24800 | 24900 | 2.0 |
| 9 | $Ba(Zn_{1/3}Ta_{2/3})O_3$ | 1.25 | K | 2.50 | 29.3 | 93900 | 95400 | 27900 | 27700 | -0.8 |
| 10 | $Ba(Zn_{1/3}Ta_{2/3})O_3$ | 1.44 | K | 2.50 | 28.6 | 84800 | 85000 | 27300 | 27200 | -0.3 |
| 11 | $Ba(Zn_{1/3}Ta_{2/3})O_3$ | 1.44 | Na | 2.50 | 29.8 | 1400 | — | 1100 | — | 6.0 |
| 12 | $Ba(Zn_{1/3}Ta_{2/3})O_3$ | 1.44 | Li | 2.50 | 28.6 | 4100 | 4000 | 3400 | 2900 | 0.3 |

TABLE 6

| Experimental Example | Base Composition | $A_pTaO_q$ Ingredient | | Dielectric Properties | | | | | |
|---|---|---|---|---|---|---|---|---|---|
| | | Value of p | A | Proportion (mol %) | $\epsilon_r$ | Qxf (GHz) 01δ/grinding | Qxf (GHz) 01δ/polishing | Qxf (GHz) 011/grinding | Qxf (GHz) 011/polishing | $\tau_f$ (ppm/° C.) |
| 13 | $Ba(Mg_{1/3}Ta_{2/3})O_3$ | 1.44 | K | 2.50 | 24.2 | 97500 | — | 30100 | — | 8.2 |
| 14 | $Ba(Zr_{0.06}Zn_{0.31}Ta_{0.63})O_3$ | 1.44 | K | 2.50 | 31.4 | 98800 | 90600 | 26600 | 26200 | 8.5 |
| 15 | $Ba(Sn_{0.09}Zn_{0.30}Ta_{0.61})O_3$ | 1.44 | K | 2.50 | 28.6 | 88300 | 96400 | 27700 | 27800 | -0.2 |
| 16 | $Ba(Zn_{1/3}Ta_{2/3})O_3$ | 1.70 | K | 2.50 | 29.3 | 81300 | 79300 | 26900 | 26500 | -0.7 |
| 17 | $Ba(Zn_{1/3}Ta_{2/3})O_3$ | 2.00 | K | 2.50 | 26.2 | 1000 | 4900 | 800 | 5700 | -0.1 |
| 18 | $Ba(Zn_{1/3}Ta_{2/3})O_3$ | 3.00 | K | 2.50 | could not be determined due to weak resonance | | | | | |
| 19 | $Ba(Zn_{1/3}Ta_{2/3})O_3$ | 4.00 | K | 2.50 | cracking occurred during sintering | | | | | |
| 20 | $Ba(Zn_{1/3}Ta_{2/3})O_3$ | 5.00 | K | 2.50 | cracking occurred during sintering | | | | | |

TABLE 6-continued

| Experimental Example | Base Composition | $A_pTaO_q$ Ingredient Value of p | A | Proportion (mol %) | $\epsilon_r$ | Qxf (GHz) 01δ/grinding | Qxf (GHz) 01δ/polishing | Qxf (GHz) 011/grinding | Qxf (GHz) 011/polishing | $\tau_f$ (ppm/° C.) |
|---|---|---|---|---|---|---|---|---|---|---|
| 21 | $Ba(Zn_{1/3}Ta_{2/3})O_3$ | 1.00 | K | 5.00 | 29.0 | 37700 | 38000 | 20300 | 19500 | 4.7 |
| 22 | $Ba(Zn_{1/3}Ta_{2/3})O_3$ | 1.00 | K | 7.50 | 28.6 | 55300 | 82000 | 28000 | 29500 | 1.4 |
| 23 | $Ba(Zn_{1/3}Ta_{2/3})O_3$ | 1.00 | K | 10.0 | 29.1 | 64500 | 69200 | 26700 | 26990 | 6.6 |

TABLE 7

| Experimental Example | Base Composition | $A_pTaO_q$ Ingredient Value of p | A | Proportion (mol %) | $\epsilon_r$ | Qxf (GHz) 01δ/grinding | Qxf (GHz) 01δ/polishing | Qxf (GHz) 011/grinding | Qxf (GHz) 011/polishing | $\tau_f$ (ppm/° C.) |
|---|---|---|---|---|---|---|---|---|---|---|
| 24 | $Ba(Zn_{1/3}Ta_{2/3})O_3$ | 1.25 | K | 2.50 | 28.3 | 102900 | — | 29400 | — | −1.1 |
| 25 | $Ba(Zn_{1/3}Ta_{2/3})O_3$ | 1.25 | K | 2.50 | 28.3 | 93300 | — | 27800 | — | −0.7 |
| 26 | $Ba(Zn_{1/3}Ta_{2/3})O_3$ | 1.25 | K | 2.50 | | sinter surface melted | | | | |
| 27 | $Ba(Mg_{1/3}Ta_{2/3})O_3$ | 1.25 | K | 2.50 | 24.9 | 111600 | — | 32600 | — | 8.2 |
| 28 | $Ba(Ni_{0.03}Zn_{0.30}Ta_{0.67})O_3$ | 1.25 | K | 2.50 | 28.5 | 88300 | — | 28100 | — | −2.8 |
| 29 | $Ba(Ni_{0.08}Zn_{0.25}Ta_{0.67})O_3$ | 1.25 | K | 2.50 | 27.4 | 71100 | — | 27000 | — | −4.2 |
| 30 | $Ba(Ga_{0.01}Zn_{0.33}Ta_{0.66})O_3$ | 1.25 | K | 2.50 | 28.8 | 112600 | — | 29600 | — | −1.8 |
| 31 | $Ba(Ga_{0.03}Zn_{0.32}Ta_{0.65})O_3$ | 1.25 | K | 2.50 | 28.6 | 109000 | — | 29400 | — | −3.2 |
| 32 | $Ba(Zr_{0.02}Zn_{0.33}Ta_{0.65})O_3$ | 1.25 | K | 2.50 | 28.8 | 85600 | — | 27700 | — | 1.5 |
| 33 | $Ba(Zr_{0.06}Zn_{0.31}Ta_{0.63})O_3$ | 1.25 | K | 2.50 | 30.8 | 89700 | — | 26700 | — | 9.3 |
| 34 | $Ba(Zn_{0.33}Nb_{0.07}Ta_{0.60})O_3$ | 1.25 | K | 2.50 | 29.6 | 94500 | — | 27300 | — | 2.5 |
| 35 | $Ba(Zn_{0.33}Nb_{0.17}Ta_{0.50})O_3$ | 1.25 | K | 2.50 | 29.8 | 95300 | — | 27400 | — | 3.4 |

TABLE 8

| Experimental Example | Base Composition | $A_pTaO_q$ Ingredient Value of p | A | Proportion (mol %) | $\epsilon_r$ | Qxf (GHz) 01δ/grinding | Qxf (GHz) 01δ/polishing | Qxf (GHz) 011/grinding | Qxf (GHz) 011/polishing | $\tau_f$ (ppm/° C.) |
|---|---|---|---|---|---|---|---|---|---|---|
| 36 | $Ba(Mg_{1/3}Ta_{2/3})O_3$ | — | — | 0 | 22.7 | 23700 | — | 18500 | — | 12.6 |
| 37 | $Ba(Mg_{1/3}Ta_{2/3})O_3$ | 1.00 | K | 2.50 | 23.9 | 97800 | — | 31300 | — | 10.5 |
| 38 | $Ba(Mg_{1/3}Ta_{2/3})O_3$ | 1.00 | K | 5.00 | 25.4 | 94700 | — | 30900 | — | 9.6 |
| 39 | $Ba(Mg_{1/3}Ta_{2/3})O_3$ | 1.25 | K | 5.00 | 25.2 | 95800 | — | 31200 | — | 9.5 |
| 40 | $Ba(Sn_{0.15}Mg_{0.28}Ta_{0.57})O_3$ | — | — | 0 | 21.9 | 40800 | — | 22900 | — | −3.4 |
| 41 | $Ba(Sn_{0.05}Mg_{0.32}Ta_{0.63})O_3$ | 1.25 | K | 2.50 | 25.5 | 70400 | — | 29500 | — | 2.7 |
| 42 | $Ba(Sn_{0.10}Mg_{0.30}Ta_{0.60})O_3$ | 1.25 | K | 2.50 | 24.4 | 113200 | — | 33000 | — | 1.9 |
| 43 | $Ba(Sn_{0.15}Mg_{0.28}Ta_{0.57})O_3$ | 1.25 | K | 2.50 | 24.1 | 139400 | — | 34900 | — | 0.5 |
| 44 | $Ba(Sn_{0.20}Hg_{0.27}Ta_{0.53})O_3$ | 1.25 | K | 2.50 | 23.6 | 127000 | — | 33900 | — | −5.2 |
| 45 | $Ba(Sn_{0.25}Mg_{0.25}Ta_{0.50})O_3$ | 1.25 | K | 2.50 | 23.1 | 114200 | — | 34100 | — | −6.4 |
| 46 | $Ba(Sn_{0.15}Mg_{0.28}Ta_{0.57})O_3$ | 1.25 | K | 1.00 | 24.1 | 116200 | — | 33000 | — | −5.4 |
| 47 | $Ba(Sn_{0.15}Mg_{0.28}Ta_{0.57})O_3$ | 1.25 | K | 5.00 | 23.7 | 143700 | — | 34300 | — | −1.8 |
| 48 | $Ba(Sn_{0.15}Mg_{0.28}Ta_{0.57})O_3$ | 1.25 | K | 10.0 | 24.0 | 103700 | — | 32300 | — | 1.3 |

TABLE 9

| Experimental Example | Base Composition (wt %) | $A_pTaO_q$ Ingredient Value of p | A | Proportion (mol %) | Density (g/cm³) | Degree of shrinkage (%) |
|---|---|---|---|---|---|---|
| 1 | $Ba(Zn_{1/3}Ta_{2/3})O_3$ | — | — | 0.00 | 7.33 | 14.8 |
| 2 | $Ba(Zn_{1/3}Ta_{2/3})O_3$ | 1.00 | K | 0.25 | 7.74 | 17.1 |
| 3 | $Ba(Zn_{1/3}Ta_{2/3})O_3$ | 1.00 | K | 0.50 | 7.76 | 19.5 |
| 4 | $Ba(Zn_{1/3}Ta_{2/3})O_3$ | 1.00 | K | 1.50 | 7.67 | 18.8 |
| 5 | $Ba(Zn_{1/3}Ta_{2/3})O_3$ | 0.50 | K | 2.50 | 7.77 | 18.9 |
| 6 | $Ba(Zn_{1/3}Ta_{2/3})O_3$ | 0.70 | K | 2.50 | 7.78 | 18.9 |
| 7 | $Ba(Zn_{1/3}Ta_{2/3})O_3$ | 0.85 | K | 2.50 | 7.79 | 19.5 |
| 8 | $Ba(Zn_{1/3}Ta_{2/3})O_3$ | 1.00 | K | 2.50 | 7.79 | 19.1 |
| 9 | $Ba(Zn_{1/3}Ta_{2/3})O_3$ | 1.25 | K | 2.50 | 7.78 | 18.7 |
| 10 | $Ba(Zn_{1/3}Ta_{2/3})O_3$ | 1.44 | K | 2.50 | 7.75 | 18.4 |
| 11 | $Ba(Zn_{1/3}Ta_{2/3})O_3$ | 1.44 | Na | 2.50 | 7.69 | 18.4 |
| 12 | $Ba(Zn_{1/3}Ta_{2/3})O_3$ | 1.44 | Li | 2.50 | 7.65 | 18.2 |
| 13 | $Ba(Mg_{1/3}Ta_{2/3})O_3$ | 1.44 | K | 2.50 | 7.44 | 22.0 |
| 14 | $Ba(Zr_{0.06}Zn_{0.31}Ta_{0.63})O_3$ | 1.44 | K | 2.50 | 7.64 | 17.9 |
| 15 | $Ba(Sn_{0.09}Zn_{0.30}Ta_{0.61})O_3$ | 1.44 | K | 2.50 | 7.65 | 18.0 |

TABLE 9-continued

| Experimental Example | Base Composition (wt %) | $A_p TaO_q$ Ingredient Value of p | A | Proportion (mol %) | Density (g/cm$^3$) | Degree of shrinkage (%) |
|---|---|---|---|---|---|---|
| 16 | Ba(Zn$_{1/3}$Ta$_{2/3}$)O$_3$ | 1.70 | K | 2.50 | 7.72 | 18.5 |
| 17 | Ba(Zn$_{1/3}$Ta$_{2/3}$)O$_3$ | 2.00 | K | 2.50 | 7.28 | 17.1 |
| 18 | Ba(Zn$_{1/3}$Ta$_{2/3}$)O$_3$ | 3.00 | K | 2.50 | 7.07 | 17.9 |

TABLE 10

| Experimental Example | Base Composition (wt %) | $A_p TaO_q$ Ingredient Value of p | A | Proportion (mol %) | Density (g/cm$^3$) | Degree of shrinkage (%) |
|---|---|---|---|---|---|---|
| 19 | Ba(Zn$_{1/3}$Ta$_{2/3}$)O$_3$ | 4.00 | K | 2.50 | cracking occurred during sintering | |
| 20 | Ba(Zn$_{1/3}$Ta$_{2/3}$)O$_3$ | 5.00 | K | 2.50 | cracking occurred during sintering | |
| 21 | Ba(Zn$_{1/3}$Ta$_{2/3}$)O$_3$ | 1.00 | K | 5.00 | 7.67 | 20.1 |
| 22 | Ba(Zn$_{1/3}$Ta$_{2/3}$)O$_3$ | 1.00 | K | 7.50 | 7.48 | 18.7 |
| 23 | Ba(Zn$_{1/3}$Ta$_{2/3}$)O$_3$ | 1.00 | K | 10.0 | 7.37 | 19.1 |
| 24 | Ba(Zn$_{1/3}$Ta$_{2/3}$)O$_3$ | 1.25 | K | 2.50 | 7.68 | 18.1 |
| 25 | Ba(Zn$_{1/3}$Ta$_{2/3}$)O$_3$ | 1.25 | K | 2.50 | 7.60 | 17.8 |
| 26 | Ba(Zn$_{1/3}$Ta$_{2/3}$)O$_3$ | 1.25 | K | 2.50 | 7.56 | ** |
| 27 | Ba(Mg$_{1/3}$Ta$_{2/3}$)O$_3$ | 1.25 | K | 2.50 | 7.37 | 23.7 |
| 28 | Ba(Ni$_{0.03}$Zn$_{0.30}$Ta$_{0.67}$)O$_3$ | 1.25 | K | 2.50 | 7.63 | 17.7 |
| 29 | Ba(Ni$_{0.08}$Zn$_{0.25}$Ta$_{0.67}$)O$_3$ | 1.25 | K | 2.50 | 7.60 | 17.5 |
| 30 | Ba(Ga$_{0.01}$Zn$_{0.33}$Ta$_{0.66}$)O$_3$ | 1.25 | K | 2.50 | 7.52 | 18.0 |
| 31 | Ba(Ga$_{0.03}$Zn$_{0.32}$Ta$_{0.65}$)O$_3$ | 1.25 | K | 2.50 | 7.40 | 17.8 |
| 32 | Ba(Zr$_{0.02}$Zn$_{0.33}$Ta$_{0.65}$)O$_3$ | 1.25 | K | 2.50 | 7.66 | 18.1 |
| 33 | Ba(Zr$_{0.06}$Zn$_{0.31}$Ta$_{0.63}$)O$_3$ | 1.25 | K | 2.50 | 7.69 | 18.4 |
| 34 | Ba(Zn$_{0.33}$Nb$_{0.07}$Ta$_{0.60}$)O$_3$ | 1.25 | K | 2.50 | 7.41 | 17.3 |
| 35 | Ba(Zn$_{0.33}$Nb$_{0.17}$Ta$_{0.50}$)O$_3$ | 1.25 | K | 2.50 | 7.24 | 17.0 |

**Sinter surface melted.

TABLE 11

| Experimental Example | Base Composition (wt %) | $A_p TaO_q$ Ingredient Value of p | A | Proportion (mol %) | Density (g/cm$^3$) | Degree of shrinkage (%) |
|---|---|---|---|---|---|---|
| 36 | Ba(Mg$_{1/3}$Ta$_{2/3}$)O$_3$ | — | — | 0 | 7.23 | 20.7 |
| 37 | Ba(Mg$_{1/3}$Ta$_{2/3}$)O$_3$ | 1.00 | K | 2.50 | 7.53 | 23.9 |
| 38 | Ba(Mg$_{1/3}$Ta$_{2/3}$)O$_3$ | 1.00 | K | 5.00 | 7.43 | 23.8 |
| 39 | Ba(Mg$_{1/3}$Ta$_{2/3}$)O$_3$ | 1.25 | K | 5.00 | 7.48 | 22.3 |
| 40 | Ba(Sn$_{0.15}$Mg$_{0.26}$Ta$_{0.57}$)O$_3$ | — | — | — | 6.95 | 21.0 |
| 41 | Ba(Sn$_{0.05}$Mg$_{0.32}$Ta$_{0.53}$)O$_3$ | 1.25 | K | 2.50 | 7.49 | 24.4 |
| 42 | Ba(Sn$_{0.10}$Mg$_{0.30}$Ta$_{0.50}$)O$_3$ | 1.25 | K | 2.50 | 7.49 | 22.0 |
| 43 | Ba(Sn$_{0.15}$Mg$_{0.28}$Ta$_{0.57}$)O$_3$ | 1.25 | K | 2.50 | 7.41 | 22.4 |
| 44 | Ba(Sn$_{0.20}$Mg$_{0.27}$Ta$_{0.53}$)O$_3$ | 1.25 | K | 2.50 | 7.39 | 22.8 |
| 45 | Ba(Sn$_{0.25}$Mg$_{0.25}$Ta$_{0.50}$)O$_3$ | 1.25 | K | 2.50 | 7.39 | 22.1 |
| 46 | Ba(Sn$_{0.15}$Mg$_{0.28}$Ta$_{0.57}$)O$_3$ | 1.25 | K | 1.00 | 7.47 | 22.7 |
| 47 | Ba(Sn$_{0.15}$Mg$_{0.28}$Ta$_{0.57}$)O$_3$ | 1.25 | K | 5.00 | 7.31 | 21.9 |
| 48 | Ba(Sn$_{0.15}$Mg$_{0.28}$Ta$_{0.57}$)O$_3$ | 1.25 | K | 10.0 | 7.19 | 22.5 |

TABLE 12

| Experimental Example | Base composition | Value of p | Proportion of $K_p TaO_q$ (mol %) | | Elemental Composition (wt. %) | | | | |
|---|---|---|---|---|---|---|---|---|---|
| | | | | | K | Ba | Zn | Ta | O |
| 8 | Ba(Zn$_{1/3}$Ta$_{2/3}$)O$_3$ | 1.00 | 2.50 | Theoretical value | 0.30 | 41.04 | 6.51 | 37.44 | 14.71 |
| | | | | Measured value | 0.21 (30.0) | 40.10 | 6.22 | — | — |
| 23 | Ba(Zn$_{1/3}$Ta$_{2/3}$)O$_3$ | 1.00 | 10.0 | Theoretical value | 1.22 | 38.41 | 6.09 | 39.36 | 14.92 |
| | | | | Measured value | 1.07 (12.3) | 37.70 | 5.81 | — | — |

What is claimed is:

1. A dielectric material comprising a complex metal oxide having a perovskite crystal structure wherein the complex metal oxide contains:
- a first metal oxide wherein the metal comprises Ba and at least two metals selected from Zn, Ta, and a metal Q, wherein Q is selected from the group consisting of Mg, Ca, Sr, La, B, Al, Ga, Ti, Zr, Hf, V, Nb, Si, Sn, Sb, Mn, Fe, Co, W, and Ni; and
- a second metal oxide wherein the metal comprises K and Ta.

2. The dielectric material of claim 1, wherein Q is selected from the group consisting of Mg, Zr, Ga, Ni, Nb, and Sn.

3. The dielectric material of claim 1, wherein the first metal oxide comprises Ba, Ta and at least one metal selected from Zn and Q.

4. The dielectric material of claim 1, wherein the first metal oxide comprises Zn and Ta.

5. The dielectric material of claim 1, wherein the molar ratio of (i) Ba to (ii) the sum of the two metals selected from Zn, Ta, and Q in the first metal oxide is about 1:1.

6. The dielectric material of claim 5, wherein the first oxide is $Ba(Zn_{1/3}Ta_{2/3})O_3$.

7. The dielectric material of claim 6, wherein the second metal oxide is a potassium tantalum oxide.

8. The dielectric material of claim 7, wherein the dielectric material comprises 99.9–80 mol % $Ba(Zn_{1/3}Ta_{2/3})O_3$ and 0.1–20 mol % of a potassium tantalum oxide; and
- wherein the molar ratio of potassium to tantalum in the potassium tantalum oxide ranges from 0.60:1 to 2.00:1.

9. The dielectric material of claim 8, wherein the molar ratio of potassium to tantalum in the potassium tantalum oxide ranges from 1.00:1 to 2.00:1.

10. The dielectric material of claim 7, wherein the dielectric material comprises 99.9–85 mol % $Ba(Zn_{1/3}Ta_{2/3})O_3$ and 0.1–15 mol % of a potassium tantalum oxide; and
- wherein the molar ratio of potassium to tantalum in the potassium tantalum oxide ranges from 0.60:1 to 2.00:1.

11. The dielectric material of claim 10, wherein the molar ratio of potassium to tantalum in the potassium tantalum oxide ranges from 1.00:1 to 2.00:1.

12. A complex metal oxide having a perovskite crystal structure wherein the complex metal oxide consists essentially of:
- a first metal oxide wherein the metal consists of Ba and at least two metals selected from Zn, Ta, and a metal Q, wherein Q is selected from the group consisting of Mg, Ca, Sr, La, B, Al, Ga, Ti, Zr, Hf, V, Nb, Si, Sn, Sb, Mn, Fe, Co, W, and Ni; and
- a second metal oxide wherein the metal consists of K and Ta.

13. The complex metal oxide of claim 12, wherein Q is selected from the group consisting of Mg, Zr, Ga, Ni, Nb, and Sn.

14. The complex metal oxide of claim 12, wherein the first metal oxide comprises Ta and at least one metal selected from Zn and Q.

15. The complex metal oxide of claim 12, wherein the first metal oxide comprises Zn and Ta.

16. The complex metal oxide of claim 12, wherein the molar ratio of (i) Ba to (ii) the sum of the two metals selected from Zn, Ta, and Q in the first metal oxide is about 1:1.

17. The complex metal oxide of claim 16, wherein the first oxide is $Ba(Zn_{1/3}Ta_{2/3})O_3$.

18. The complex metal oxide of claim 17, wherein the second metal oxide is a potassium tantalum oxide.

19. The complex metal oxide of claim 18, wherein the dielectric material comprises 99.9–80 mol % $Ba(Zn_{1/3}Ta_{2/3})O_3$ and 0.1–20 mol % of a potassium tantalum oxide; and
- wherein the molar ratio of potassium to tantalum in the potassium tantalum oxide ranges from 0.60:1 to 2.00:1.

20. The complex metal oxide of claim 19, wherein the molar ratio of potassium to tantalum in the potassium tantalum oxide ranges from 1.00:1 to 2.00:1.

21. The complex metal oxide of claim 18, wherein the dielectric material comprises 99.9–85 mol % $Ba(Zn_{1/3}Ta_{2/3})O_3$ and 0.1–15 mol % of a potassium tantalum oxide; and
- wherein the molar ratio of potassium to tantalum in the potassium tantalum oxide ranges from 0.60:1 to 2.00:1.

22. The complex metal oxide of claim 21, wherein the molar ratio of potassium to tantalum in the potassium tantalum oxide ranges from 1.00: 1 to 2.00:1.

23. A complex oxide having a perovskite crystal structure comprising:
- about 40 to about 50 wt % BaO;
- about 6 to about 9 wt % ZnO;
- up to about 16 wt % of a metal oxide of Mg, Zr, Ga, Ni, Nb, or Sn, or combinations thereof;
- about 30 to about 49 wt % $Ta_2O_5$; and
- about 0.04 to about 2 wt % $K_2O$.

24. A dielectric resonator, comprising:
- a dielectric material comprising a complex metal oxide having a perovskite crystal structure wherein the complex metal oxide comprises:
- a first metal oxide wherein the metal comprises Ba and at least two metals selected from Zn, Ta, and a metal Q, wherein Q is selected from the group consisting of Mg, Ca, Sr, La, B, Al, Ga, Ti, Zr, Hf, V, Nb, Si, Sn, Sb, Mn, Fe, Co, W, and Ni; and
- a second metal oxide wherein the metal comprises K and Ta;
- a metal casing enclosing the dielectric resonator; and
- an insulating holder member attached to the dielectric resonator with a heat-resitive adhesive layer.

25. The dielectric resonator of claim 24, wherein Q is an element selected from the group consisting of Mg, Zr, Ga, Ni, Nb and Sn.

26. The dielectric resonator of claim 24, wherein the first metal oxide comprises Ba, Ta and at least one metal selected from Zn and Q.

27. The dielectric resonator of claim 24, wherein the first metal oxide comprises Zn and Ta.

28. The dielectic resonator of claim 24, wherein the molar ratio of (i) Ba to (ii) the sum of the two metals selected from Zn, Ta, and Q in the first metal oxide is about 1:1.

29. The dielectric resonator of claim 28, wherein the first oxide is $Ba(Zn_{1/3}Ta_{2/3})O_3$.

30. The dielectric resonator of claim 29, wherein the second metal oxide is a potassium tantalum oxide.

31. The dielectric resonator of claim 30, wherein the dielectric material comprises 80–99.9 mol % $Ba(Zn_{1/3}Ta_{2/3})O_3$ and 0.1–20 mol % of a potassium tantalum oxide; and
- wherein the molar ration of potassium to tantalum in the potassium tantalum oxide ranges from 0.60:1 to 2.00:1.

32. The dielectric resonator of claim 31, wherein the molar ration of potassium to tantalum in the potassium tantalum oxide ranges from 1.00:1 to 2.00:1.

33. The dielectric resonator of claim 30, wherein the dielectric material comprises 85–99.9 mol % $Ba(Zn_{1/3}Ta_{2/3})O_3$ and 0.1–15 mol % of a potassium tantalum oxide; and
- wherein the molar ratio of potassium to tantalum in the potassium tantalum oxide ranges from 0.60:1 to 2.00:1.

34. The dielectric resonator of claim 33, wherein the molar ratio of potassium to tantalum in the potassium tantalum oxide ranges from 1.00:1 to 2.00:1.

35. A method of producing a complex metal oxide having a perovskite crystal structure, wherein the complex metal oxide comprises:
- a first metal oxide wherein the metal comprises Ba and at least two metals selected from Zn, Ta, and a metal Q, wherein Q is selected from the group consisting of Mg, Ca, Sr, La, B, Al, Ga, Ti, Zr, Hf, V, Nb, Si, Sn, Sb, Mn, Fe, Co, W, and Ni; and
- a second metal oxide wherein the metal comprises K and Ta, the method comprising the steps of:
- mixing a barium compound with at least two metals selected from Zn, Ta, and a metal Q, wherein Q is selected from the group consisting of Mg, Ca, Sr, La, B, Al, Ga, Ti, Zr, Hf, V, Nb, Si, Sn, Sb, Mn, Fe, Co, W, and Ni to produce a mixture;
- compacting the mixture to produce a compact;
- sintering the compact at a sintering temperture of between 1,300 and 1,650° C; and
- heat-treating the compact at a temperture 50–250° C. lower than the sintering temperture in an oxidizing atmosphere for at least 12 hours.

36. The method of claim 35, wherein Q is selected from the group consisting of Mg, Zr, Ga, Ni, Nb, and Sn.

37. The method of claim 35, wherein the sintering is conducted at a temperature of between 1,400 and 1,600° C.

38. The method of claim 37, wherein the sintering is conducted at a temperature of between 1,550 and 1,600° C.

39. The method of claim 35, wherein the heat treatment is conducted at a temperature 70–200° C. lower than the sintering temperature.

40. The method of claim 39, wherein the heat treatment is conducted at a temperature 80–150° C. lower than the sintering temperature.

41. The method of claim 35, wherein air is used as the oxidizing atmosphere.

42. The method of claim 35, wherein Q is selected from the group consisting of Mg, Zr, Ga, Ni, Nb, and Sn.

43. The method of claim 35, wherein the first metal oxide comprises Ba, Zn and Ta.

44. The method of claim 35, wherein the molar ratio of (i) Ba to (ii) the sum of the two metals selected from Zn, Ta, and Q in the first metal oxide is about 1:1.

45. The method of claim 44, wherein the first oxide is $Ba(Zn_{1/3}Ta_{2/3})O_3$.

46. The method fo claim 45, wherein the second metal oxide is a potassium tantalum oxide.

47. The method of claim 46, wherein the complex metal oxide comprises 80–99.9 mol % $Ba(Zn_{1/3}Ta_{2/3})O_3$ and 0.1–20 mol % of a potassium tantalum oxide; and
wherein the molar ratio of potassium to tantalum in the potassium tantalum oxide ranges from 0.60:1 to 2.00:1.

48. The method of claim 47, wherein the molar ratio of potassium to tantalum in the potassium tantalum oxide ranges from 1.00:1 to 2.00:1.

49. The method of claim 46, wherein the dielectric material comprises 85–99.9 mol % $Ba(Zn_{1/3}Ta_{2/3})O_3$ and 0.1–15 mol % of a potassium tantalum oxide; and
wherein the molar ratio of potassium to tantalum in the potassium tantalum oxide ranges from 0.60:1 to 2.00:1.

50. The method of claim 49, wherein the molar ratio of potassium to tantalum in the potassium tantalum oxide ranges from 1.00:1 to 2.00:1.

51. A dielectric resonator, comprising:
- a dielectric material comprising a complex metal oxide having a perovskite crystal structure wherein the complex metal oxide comprises:
- about 40 to about 50 wt % BaO;
- about 6 to about 9 wt % ZnO;
- up to about 16 wt % of a metal oxide of Mg, Zr, Ga, Ni, Nb, or Sn, or combinations thereof;
- about 30 to about 49 wt % $Ta_2O_5$; and
- about 0.04 to about 2 wt % $K_2O$;
- a metal casing enclosing the dielectric resonator; and
- an insulating holder member attached to the dielectric resonator with a heat-resistive adhesive layer.

* * * * *

UNITED STATES PATENT AND TRADEMARK OFFICE
CERTIFICATE OF CORRECTION

PATENT NO. : 6,117,806
DATED : September 12, 2000
INVENTOR(S) : Hitoshi YOKOI, et al.

It is certified that error appears in the above-identified patent and that said Letters Patent is hereby corrected as shown below:

<u>IN THE CLAIMS</u>:

In col. 20, line 58, replace "ration" with --ratio--.

In col. 20, line 61, replace "ration" with --ratio--.

Signed and Sealed this

Eighth Day of May, 2001

*Attest:*

NICHOLAS P. GODICI

*Attesting Officer*   *Acting Director of the United States Patent and Trademark Office*